J. R. BENNETT.
ROTARY CHURN.

No. 182,631.   Patented Sept. 26, 1876.

WITNESSES:
Francis McArdle,
John Goethals

INVENTOR:
J. R. Bennett
BY Munn & Co
ATTORNEYS.

UNITED STATES PATENT OFFICE.

JOHN R. BENNETT, OF NUNDA, NEW YORK, ASSIGNOR TO JAMES A. DURYEE, OF SAME PLACE.

IMPROVEMENT IN ROTARY CHURNS.

Specification forming part of Letters Patent No. 182,631, dated September 26, 1876; application filed June 20, 1876.

*To all whom it may concern:*

Figure 1:
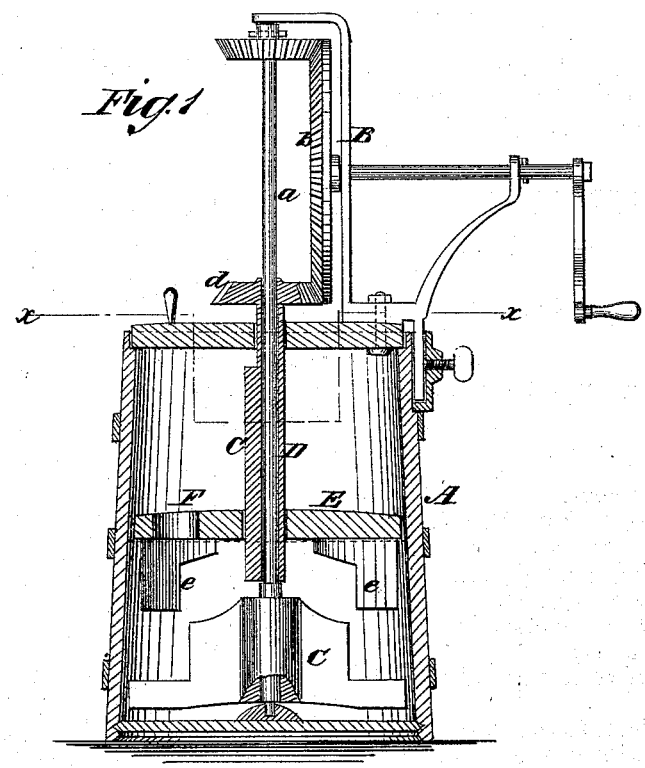
Figure 2:
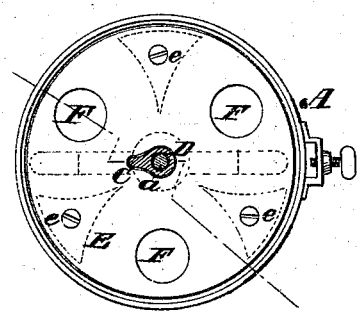

Be it known that I, JOHN R. BENNETT, of Nunda, Livingston county, New York, have invented a new and Improved Churn, of which the following is a specification:

Figure 1 is a vertical section, and Fig. 2 is a section on line $x\,x$, Fig. 1.

Similar letters of reference indicate corresponding parts.

My invention relates to that class of churns that are provided with dashers that revolve in opposite directions; and it consists in the combination of a floating dasher with a feathered shaft in such a manner that while the dasher floats on the surface of the cream it is carried around by the said shaft.

A is the ordinary churn, provided with the gearing B, which revolves the dashers in opposite directions. The lower dasher C is fixed to the shaft $a$, which takes its motion from the upper side of the wheel $b$. D is a hollow shaft, which is placed on the shaft $a$, and is provided with a feather, $c$, and bevel-pinion $d$, and takes its motion from the lower side of the wheel $b$. A dasher, E, is placed on the shaft D, and is slotted to engage with the feather $c$, so that the shaft carries the dasher around with it. The dasher E is provided with three wings, $e$, projecting downward from it, which conform nearly to the wings on the dasher C. Holes F are made in the dasher E, between the wings $e$.

The dasher E moves up or down freely on the shaft D, and accommodates itself to any depth of cream. The wings $e$ are concaved, as shown in dotted lines in Fig. 2, in such a manner as to throw the cream toward the center of the churn.

The advantage claimed for my invention is that the cream is confined by the floating dasher, so that it is more thoroughly acted upon by the wings of the dashers, producing an increased quantity of butter in a shorter time than when the ordinary dasher is used.

Having thus described my invention, I claim as new and desire to secure by Letters Patent—

1. In a churn having revolving dashers, a floating dasher, which rests upon the surface of the cream, and is rotated by means of a feathered shaft driven by a suitable gearing, substantially as shown and described.

2. The combination of the floating dasher E, dashers C, feathered shaft D, and gearing B, substantially as shown and described.

3. A dasher consisting of the concaved wings $e$, attached to a suitable disk having the apertures F, as specified.

JOHN R. BENNETT.

Witnesses:
GEO. W. DAGGETT,
E. DAGGETT.